Figure 2:
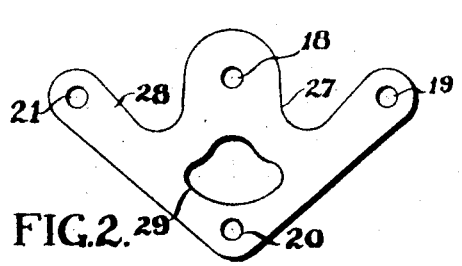
Figure 4:
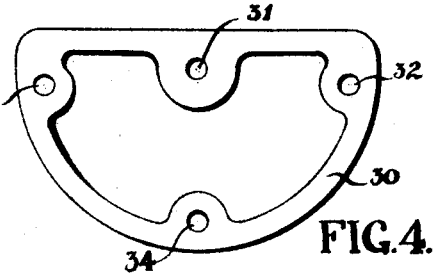
Figure 3:
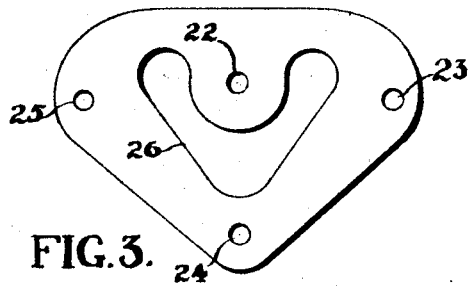
Figure 1:
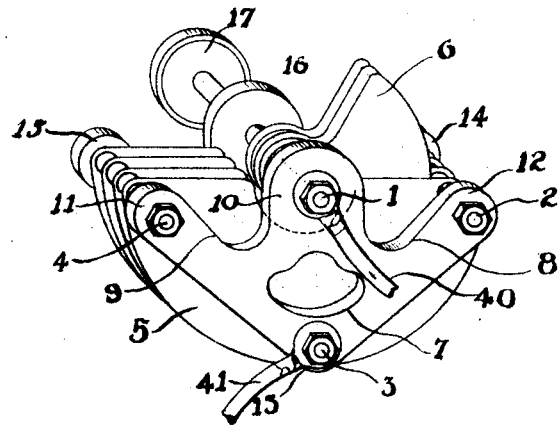

July 6, 1926.

J. J. JAKOWSKY 1,591,131

DIELECTRIC SUPPORTING PLATE FOR VARIABLE AIR CONDENSERS

Filed April 30, 1924

Witnesses:
1. Henry Becker
2. Mabel McCall

John Jay Jakowsky
INVENTOR.

BY A.B.McCall
ATTORNEY.

Patented July 6, 1926.

1,591,131

UNITED STATES PATENT OFFICE.

JOHN JAY JAKOWSKY, OF PITTSBURGH, PENNSYLVANIA, ASSIGNOR OF ONE-FOURTH TO A. B. McCALL, OF SPRINGFIELD, ILLINOIS.

DIELECTRIC SUPPORTING PLATE FOR VARIABLE AIR CONDENSERS.

Application filed April 30, 1924. Serial No. 709,983.

This invention relates to certain new improvements in the design and construction of supporting plates for variable air condensers which are required to be made of some insulating material which has supporting strength and efficient insulating properties.

One of the principal objects of my invention is to provide a dielectric supporting plate for variable air condensers which is simple in its design and particularly adapted to minimize dielectric losses which are so common in many dielectric supporting plates that are now being used in variable air condensers in connection with radio apparatus, electrical appliances, and the like.

Another object of my invention is to provide a dielectric supporting plate for variable air condensers which in its design provides a substantial bearing for the supporting rods holding the movable and stationary plates of the variable air condensers and in the meantime provided with spaced apertures in the plane surface of the supporting plates in such a position as will throw an open air space across the direct straight line of the current travel between the central bearing (supporting movable condenser plates) which have one polarity and the several bearings in the same dielectric plate supporting the stationary condenser plates which carry an opposite polarity.

A further object of my invention is to provide a dielectric supporting plate for variable air condensers which will very greatly increase the efficiency of variable air condensers used in connection therewith because of the dielectric plate's peculiarly efficient construction which positively eliminates any chance for direct straight line of travel of the displacement current existing on account of the reaction of the electric stress due to a steady application of E. M. F. through the condenser terminals when the electric strain or displacement is changing sign.

A further object of my invention is to provide a dielectric supporting plate, of the character described, for the support of variable air condenser terminals as a dielectric in the design of which provision is made for requiring a maximum of travel for any leakage current or leakage of displacement or dielectric current which might exist along the surface of the dielectric suporting plate in some small measure due to the existence of electric strain as the condenser charging current arises and diminishes in alternately opposite directions as to polarity.

Before attempting to intelligibly explain the merits of my invention it may perhaps be well to explain in small measure something of the function of the dielectric supporting plate with particular reference to its function as a supporting plate for variable air condensers in radio high frequency currents.

A large percentage of the condensers on the market are subject to strong criticism for their mechanical construction. Condensers should be designed so that the relative position between stationary and movable plates will not change in use or when subjected to changes in temperature. Some of the materials which are the best from an electrical point of view, that is having the least losses, are usually unsuitable mechanically. Hard rubber and porcelain may be cited as example of these classes; hard rubber being an excellent material to machine and manufacture, but usually warps when subjected to any strain. Porcelain is a hard material to manufacture but when once in place can be depended upon providing it is not subjected to strains or jars which will crack it. Bakelite or similar materials are ideal both as regards ease of manufacture and mechanical strength, but are poor to use because of their high electrical losses. It is the purpose of the new design to allow materials which are mechanically strong and which can be readily manufactured to be used, the design being such that all electrical losses are minimized and usually to a value much less than that of present commercial designs using the very best of electrical insulating material.

The most important point in variable condenser design is low power loss. This has received the least attention by the majority of manufacturers. If the insulation resistance of a condenser is low, leakage takes place which allows the condenser to discharge by ordinary conduction through the dielectric and its effect on the power factor of the condenser is inversely proportional to the frequency.

It will be borne in mind that the air between the plates of opposite polarity namely: (the movable and stationary plates) do not act as a conductor but merely as a neutral field or dielectric field for the reception and discharge of alternating displacement currents produced through the electric stress or strain existing in the circuit carried by the conducting plates that are separated by the air dielectric.

In this connection it is very evident that if the conductors represented by the movable and stationary plates of the condenser did not have to be supported by anything; that there would not be any current losses due to outside influences such as in actual practice evidently takes place. For instance, when some supporting means is provided for sustaining the air condenser plates in their relative normally spaced relation the supporting means will be or should be made of a material that has the smallest possible dielectric constant or the ratio of its dielectric qualities to that of air. (Air being the standard and the best dielectric.)

Many substances that might be used as insulator supporting plates tend to absorb a small amount of moisture very easily and in some of these substances the presence of such moisture will considerably increase the surface leakage. So it is seen that such dielectric materials as are available for supporting plates for variable air condensers are not likely to be perfect. On the contrary if the supporting plates should permit no losses or leakages, a pair of spaced condenser plates oppositely charged with dry air as a dielectric between them would retain the charge indefinitely.

In this connection with the use of variable air condensers in radio circuits and other electrical connections the efficiency of such condenser is measured in terms of the capacity of the condenser or its ability to normally function continuously and efficiently under electric strains produced by the application of E. M. F. The most efficient condenser therefore of the variable air condenser type would be one that is absolutely reliable and constant in its reception and discharge of its displacement currents when in normal use.

It being an object therefore of my invention to prevent avoidable losses in variable air condensers where such losses may be avoided through improved design of the insulator supporting plates of the condensers, I attain the objects sought for through the novel and merited elements of its design which will be carefully described in the annexed specifications, recited in the claims and illustrated in the accompanying drawings in which like reference numerals indicate the same structural parts in the several figures.

The figures will now be explained:

Figure —1— is an oblique drawing of a variable air condenser having for its dielectric supporting end plates a pair of the designed insulator supporting plates of my invention.

Figure —2— is a front elevation of the device of my invention shown in one of its designs such as is used in the oblique drawing shown in Fig. —1—.

Figure —3— is a front elevation of the device of my invention of a little different design but showing effectively therein a little different way to obtain the same results as may be obtained by using the design shown in Fig. —2—.

Figure —4— is still another design of a device of my invention which will effectively obtain the same results as the designs shown in Figures —1—, —2—, and —3—.

It will be noted that in the structure of the dielectric supporting end plates of my design that the means used for eliminating or minimizing the losses above mentioned is to provide in each of said supporting end plates certain spaced openings through the plate; which opening or openings are so placed as to stand in the way of any direct line of communication for stray currents which might be otherwise found to easily pass across the surface of the supporting plate or through the material thereof as long as there was a solid unbroken insulator surface along the direct stright line of communication between the supporting terminals of opposite polarity supporting the condenser plates.

Fig. —5— is a front elevation of a dielectric supporting end plate for variable air condensers which has no spaced openings positioned in the plane thereof across the direct straight line of communication between the condenser supporting terminals of opposite polarity and a type in which actual laboratory tests has positively proven to be less efficient than the condenser supporting plates of my invention. Referring now to the detailed elements of my invention and other elements concerned in the explanation of the merits of the structure and their relation to the whole structure in normal efficient operation.

When a variable air condenser of the type represented herein in Fig. —1— is assembled the parallel stationary plates —5— are positioned in spaced relation mounted on the usual three supporting shafts —2—, —3—, and —4—, respectively, movable plates —6— are mounted in spaced relation supported on a central revolvable shaft —1—. These movable plates are so spaced as to move simultaneously between the parallel stationary plates to normally function in varying the capacity of the variable air condenser. It will be seen in Fig. —1— that a wire connection —40— is detachably secured to supporting terminal —1— of the movable plates of the condenser and that wire connection —41— is likewise secured to one of the three supporting terminals of the stationary plates shown at —3—. It will be further noted that wire connection —40— is represented as carrying a positive charge and that wire connection —41— a negative charge.

When a current of high voltage in normal operation of the condenser is turned in there is a tendency sometime for leakage losses to occur across the surface of the insulating supporting plate or through the material of the same between the positive and negatively charged terminals of the supporting shafts of the condenser plates. It is obvious that where the central movable shaft —1— has a positive charge that each of the three stationary shafts —2—, —3—, and —4— would have an opposite charge or negative charge thus causing a tendency toward a leakage of current between the central movable terminal and the other three of opposite polarity which support the stationary plates.

It is also obvious that such tendency towards leakage of current through the dielectric supporting plate would be commonly caused by a possible accumulation of moisture or dust on the surface of the supporting plate or through the material of the supporting plate lying in a straight line between the terminals of opposite polarity resting in the supporting plate. Such dust or moisture would offer easy conducting elements over the path lying in direct line between the terminals which path becomes a conducting path.

It will be seen in Figures —1—, —2—, —3—, and —4— that in the dielectric supporting plate of my invention that I provide an outline for the supporting plate in combination with certain spaced apertures in the body of the same which are adapted to prevent the losses above mentioned by providing an air space between the terminals of opposite polarity and in so doing I provide a structural detail for the dielectric supporting plate which makes it obviously necessary for any leakage currents which might occur, to travel a maximum of distance in order to effect any communication at all with supporting terminals of opposite polarity.

In this connection therefore it is obvious that the supporting plate of my invention is adapted to minimize the losses through leakage through the material or over the surface of the dielectric supporting plate of my invention.

The outline —7— of the hole lying between the terminals —1— and —3— provides an air space across the direct line between these two terminals as do also outlines shown in —8— and —9— which provide an air space between terminals —1—, —2—, and —1—, and —4—.

In the outline of the supporting plate shown in the front of Figure —1— the bearing positions are located in the extremities of the supporting plate shown at —10—, —11—, —12—, —13—, —14—, —15—, and —16—.

In Figure —2— the bearing points are respectively shown at —18—, —19—, —20—, and —21— while the outline of the plate which provides the air space between the terminals of opposite polarity are shown at —27—, —28—, and the outline —29— of an aperture between bearing points —18— and —20—.

In Fig. —3— bearing points are at —22—, —23—, —24—, and —25— while outline —26— shows the arrangements of air spaces provided between the terminals of opposite polarity in this design.

Fig. —4— shows bearing points at —31—, —32—, —33—, and —34—, while outline —30— provides the necessary air spaces between the terminals of opposite polarity in such a design.

Having thus described the nature of my invention what I claim as new and useful and desire to secure by Letters Patent is:

1. A dielectric supporting end plate for the support of and in combination with a variable air condenser; said end plate having an outline of predetermined design in combination with one or more spaced apertures therein of predetermined design; said spaced apertures in said supporting end plate so positioned therein as to be adapted to provide insulating air space across the direct line between the condenser plate supporting terminals of opposite polarity for minimizing displacement current losses and dielectric leakages in the normal operation of the condenser.

2. In a dielectric supporting plate for variable air condensers of the class described the combination of an outline thereof of predetermined design with one or more spaced apertures of predetermined design and suitably positioned with respect to the bearing points of the condenser plate supporting terminals to be adapted to provide insulating air space across the line between the condenser plate supporting terminals of opposite polarity, for minimizing displacement current losses and dielectric leakages in the normal operation of the condenser.

3. A dielectric supporting end plate for variable air condensers of the class described having an outline of predetermined design in combination with a spaced aperture of predetermined design; said combination adapted to provide insulating air space across the direct line between the condenser plate supporting terminals of opposite polarity for minimizing displacement current dielectric losses and leakages in the normal operation of the condenser.

In witness whereof I hereunto set my hand and seal this 14th day of April A. D. 1924.

JOHN JAY JAKOWSKY. [L. S.]